(No Model.)
C. A. JACKSON.
ELECTRIC MOTOR.
No. 289,540. Patented Dec. 4, 1883.
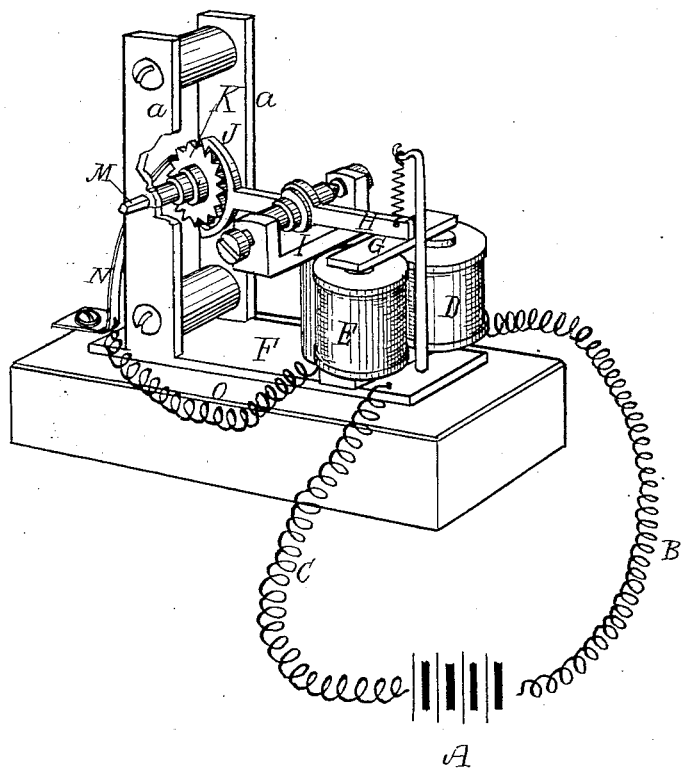
Witnesses.
S. C. Means.
A. F. Hayden.
Inventor.
Charles A. Jackson.
F. Curtis, Atty.

UNITED STATES PATENT OFFICE.

CHARLES ALMON JACKSON, OF LAWRENCE, MASSACHUSETTS, ASSIGNOR OF ONE-HALF TO D. F. ROBINSON, OF SAME PLACE.

ELECTRIC MOTOR.

SPECIFICATION forming part of Letters Patent No. 289,540, dated December 4, 1883.

Application filed September 14, 1883. (No model.)

*To all whom it may concern:*

Be it known that I, CHAS. ALMON JACKSON, a citizen of the United States, residing at Lawrence, in the county of Essex and State of Massachusetts, have invented certain new and useful Improvements in Electric Motors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In this invention I produce a motor by employing an electric armature escapement and converting the scape-wheel thereof into a circuit-controller by intermittently putting such wheel into and out of circuit through the medium of its teeth, acted upon by a finger included in the same circuit with the armature and escapement. The free end of the finger operates lightly upon the periphery of the wheel in such manner that as the teeth of such wheel successively come in contact with and pass by the finger the circuit is alternately closed and broken, and these motions, rapidly repeated, effect rapid vibrations of the armature and escapement and intermittent rotations of the wheel.

The drawing accompanying this specification represents an isometric elevation of a device embodying my invention.

In said drawing, A represents an electric battery of ordinary form, and B C the wires leading therefrom. D E represent an electro-magnet erected upon a suitable base-plate, F, and connected with one battery-wire, B, as shown. G represents an armature disposed above the magnet and raised by a coiled spring, and secured to one end of a horizontal escapement-lever, H, fulcrumed to a post, I, erected upon the plate F. J is an escapement formed upon the opposite end of the lever H, and straddling a scape-wheel, K, secured to a horizontal rotary shaft, M, which is supported in side housings, *a a*, also erected upon the said plate F. The frame of the machine, composed of the plate F and housings *a a*, is connected with the opposite pole of the battery. The above constitutes an electric armature escapement heretofore in common use.

In carrying out my invention I employ an upright elastic finger or spring, N, secured at its base to the plate F, and connected with the magnet E by a wire, O, the free end of this finger being so disposed as to bear lightly in succession upon the teeth of the scape-wheel as such teeth successively pass by it.

The operation of this simple device is as follows, the free end of the finger N in its normal position resting upon the point of one of the teeth of the scape-wheel, and the electric circuit being complete—that is, passing from the battery by wire B to the magnet D E, thence by wire O to finger N, through the latter and the scape-wheel K, shaft M, and frame F *a a*, back to the battery by the pole C: The battery being let on, the armature is attracted and lowered, and the escapement advances the scape-wheel and its shaft a distance corresponding to one tooth of such wheel, thereby carrying the tooth, which is in contact with the finger N, past the latter and breaking the circuit. The armature is now released, and by the influence of its spring is lifted, thereby advancing the scape-wheel one tooth, and bringing into contact with the finger N the tooth next succeeding the one last in contact with it, which again closes the circuit as before, and lowers the armature a second time, and these movements are repeated in rapid succession, thereby intermittently opening and closing the circuit and rotating the scape-wheel and its shaft.

I claim—

1. The combination, with an electric armature escapement and its supporting-frame, of an elastic or yielding finger connected with the two poles of the battery, and in its normal position resting at its free end upon the periphery of the scape-wheel, such finger, when in contact with a tooth of the wheel, establishing the circuit, and such circuit being broken when the finger and tooth separate, substantially as explained.

2. The combination, with an electric armature escapement, of a device operating upon the scape-wheel, substantially as explained, for alternately opening and closing the circuit through such wheel.

In testimony whereof I affix my signature in presence of two witnesses.

CHARLES ALMON JACKSON.

Witnesses:
F. CURTIS,
A. F. HAYDEN.